(12) United States Patent
Kar et al.

(10) Patent No.: US 11,127,121 B2
(45) Date of Patent: Sep. 21, 2021

(54) SYSTEM AND METHOD OF GENERATING ENHANCED VIDEO BY REMOVING FOG FOR VEHICLE NAVIGATION

(71) Applicant: Wipro Limited, Bangalore (IN)

(72) Inventors: Sibsambhu Kar, Bangalore (IN); Ankit Kumar Singh, Dhanbad (IN); Manjunath Ramachandra Iyer, Bangalore (IN)

(73) Assignee: Wipro Limited, Bangalore (IN)

(*) Notice: Subject to any disclaimer, the term of this patent is extended or adjusted under 35 U.S.C. 154(b) by 111 days.

(21) Appl. No.: 16/705,931

(22) Filed: Dec. 6, 2019

(65) Prior Publication Data

US 2020/0311887 A1 Oct. 1, 2020

(30) Foreign Application Priority Data

Mar. 29, 2019 (IN) .............................. 201941012599

(51) Int. Cl.
*G06K 9/00* (2006.01)
*G06T 5/00* (2006.01)
(Continued)

(52) U.S. Cl.
CPC .............. *G06T 5/008* (2013.01); *B60K 35/00* (2013.01); *B60R 1/00* (2013.01); *G06T 5/50* (2013.01);
(Continued)

(58) Field of Classification Search
CPC ... G06T 5/008; G06T 5/50; G06T 5/001–007; G06T 5/009; G06T 7/70;
(Continued)

(56) References Cited

U.S. PATENT DOCUMENTS 7,783,183 B2 8/2010 Garg et al.
2008/0170754 A1* 7/2008 Kawasaki .......... G06K 9/00805
382/104

(Continued)

FOREIGN PATENT DOCUMENTS

KR 101445577 B1 11/2014
WO 2014193055 A1 12/2014

OTHER PUBLICATIONS

Khan, M.N., "Machine and Deep Learning Techniques for Real-Time In-Vehicle Fog Detection and Speed Behavior Investigation Utilizing the SHRP2 Naturalistic Driving Study Data", University of Wyoming, 2016.

(Continued)

*Primary Examiner* — Jose L Couso
(74) *Attorney, Agent, or Firm* — Finnegan, Henderson, Farabow, Garrett & Dunner, LLP (57) ABSTRACT

The present invention relates to the field of dynamic content creation and management and more particularly to dynamically create and insert immersive promotional content in a multimedia. The multimedia requested by a user is procured from a media server (105) and the one or more objects present in the multimedia is determined. The content of the multimedia is analyzed, and a decision is taken to immerse the promotional content in the multimedia based on the analysis of the multimedia. Further, a promotional content is created in real time using the components present in the asset database (106) based on the personalized user profile. The created promotional content is overlaid and blended with a at least one object from the one or more objects in the multimedia. The created promotional content and the multimedia is joined to form a composite media and is streamed to the user device.

13 Claims, 7 Drawing Sheets

(51) Int. Cl.
*G06T 5/50* (2006.01)
*B60K 35/00* (2006.01)
*B60R 1/00* (2006.01)

(52) U.S. Cl.
CPC ... *B60K 2370/166* (2019.05); *B60R 2300/307* (2013.01); *G06T 2207/10016* (2013.01); *G06T 2207/20081* (2013.01); *G06T 2207/30252* (2013.01)

(58) Field of Classification Search
CPC ......... G06T 7/0002; G06T 2207/30252; G06T 2207/20081; G06T 2207/10016; G06T 2207/10048; G06T 2207/30261; G06T 2207/30242; G06T 2207/10004; G06T 2207/20012; G06T 2207/20028; G06T 2207/20192; B60K 35/00; B60K 2370/166; B60K 2370/176; B60K 2370/177; B60R 1/00; B60R 2300/307; B60R 2300/105; B60R 2300/303; B60R 2300/304; B60R 2300/106; B60R 2300/301; B60R 2300/302; B60R 2300/70; B60R 2300/802; B60R 2300/8053; B60R 2300/8066; G06K 9/00818; G06K 9/40; G06K 9/00805; G06K 9/00825; G06K 9/2018; G06K 9/4604; G06K 9/6201; G06K 9/346; G06K 9/00; B60Q 1/143; B60Q 1/20; B60Q 2300/312; B60Q 9/00; B60Q 9/008; B60W 30/08; G01W 1/14; H04N 5/232; H04N 5/232939; H04N 5/23238; H04N 7/181; H04N 21/42202; H04N 21/4223; H04N 21/2187; G01S 2013/9322; G01S 2013/93271; G01S 2013/93276; G05D 1/00; G05D 1/0033; G05D 1/0038; G05D 1/0044
See application file for complete search history.

(56) References Cited

U.S. PATENT DOCUMENTS

| | | | |
|---|---|---|---|
| 2008/0317287 A1* | 12/2008 | Haseyama | B60R 1/00 382/103 |
| 2009/0010494 A1* | 1/2009 | Bechtel | B60R 1/00 382/104 |
| 2009/0021581 A1* | 1/2009 | Sun | G06K 9/2054 348/148 |
| 2011/0285849 A1* | 11/2011 | Schofield | B60Q 1/14 348/148 |
| 2014/0044312 A1* | 2/2014 | Ehlgen | G01N 21/538 382/104 |
| 2014/0140619 A1* | 5/2014 | Mukhopadhyay | G06T 5/002 382/167 |
| 2015/0061493 A1* | 3/2015 | Jeromin | B60Q 1/143 315/82 |
| 2015/0161773 A1* | 6/2015 | Takahashi | H04N 5/272 382/173 |
| 2016/0055384 A1 | 2/2016 | Yoo | |
| 2016/0229341 A1* | 8/2016 | Singhal | B60R 1/00 |
| 2016/0232423 A1* | 8/2016 | Zhong | B60Q 1/20 |
| 2019/0164259 A1* | 5/2019 | Lian | G06T 5/009 |
| 2020/0023831 A1* | 1/2020 | Dawson | B60Q 1/1423 |

OTHER PUBLICATIONS

He, K. et al., "Single Image Haze Removal Using Dark Channel Prior", IEEE, 2009, pp. 1956-1963.
Toka, V. et al., "A Fast Method of Fog and Haze Removal", IEEE, 2016, pp. 1224-1228.
Xu, Z., et al., "Fog Removal From Video Sequences Using Contrast Limited Adaptive Histogram Equalization", IEEE, 2009.

* cited by examiner

SYSTEM AND METHOD OF GENERATING ENHANCED VIDEO BY REMOVING FOG FOR VEHICLE NAVIGATION

This application claims the benefit of Indian Patent Application Serial No. 201941012599 filed Mar. 29, 2019, which is hereby incorporated by reference in its entirety.

FIELD

The present disclosure relates to the field of navigating a vehicle. Particularly, but not exclusively, the present disclosure relates to a system and method for generating enhanced video by removing fog for vehicle navigation.

BACKGROUND

Generally, in manned or unmanned vehicle transportation domain, accidents occur due to various reasons, for example road conditions, driving behaviors, vehicle health parameters, neighbor vehicle manures, vehicular communication failures, climatic conditions and the like. But in adverse climatic or weather conditions, the major reason for vehicle accidents is the visibility of road to a driver or a driver assistance system. The visibility of the road affects quick decision-making process of the driver or the driver assistance system. The poor visibility is the resultant of dense fog or haze in the atmosphere due to various factors for example dust, temperature, climate change, and the like.

Conventional fog removal solutions usually focus on removing a white layer of fog using techniques like "dark channel prior" based on the statistics of outdoor haze-free images and transmission map using Markov random field and bilateral filters.

Additionally, the existing solutions make use of images and video which work well when the objects are close by and stationary.

An issue with the existing solutions is that exclusive saturation enhancement is not considered for fog removal.

The existing solutions for fog removal either consider a static image or consider videos of the objects in front of the camera. The speed of the vehicle along with the above parameters are not considered in the conventional fog removal algorithms which is a drawback for not having good stable fog/haze removal solution.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

Disclosed herein is a method for generating enhanced video by removing fog for vehicle navigation. The method includes identifying, a Region of Interest (ROI) in a plurality of frames extracted from a captured video associated with a vehicle. Further, the method includes computing, a plurality of function parameters indicative of variation of saturation across the plurality of frames for the identified ROI. Furthermore, the method includes modifying, the plurality of function parameters across the plurality of frames for the identified ROI, based on a speed of the vehicle. Thereafter, the method includes enhancing, a saturation value in a new frame received subsequent to the plurality of frames of the captured video, based on the modified plurality of function parameters across the plurality of frames to obtain an enhanced video. Subsequently, the enhanced saturation value may be further dynamically tuned by updating the plurality of function parameters. Finally, the method includes navigating the vehicle based on the enhanced video.

Further, the present disclosure includes an image enhancing unit for generating enhanced video by removing fog for vehicle navigation. The image enhancing unit includes a processor and a memory communicatively coupled to the processor. The memory stores the processor-executable instructions, which, on execution, cause the processor to identify a Region of Interest (ROI) in a plurality of frames extracted from a captured video. Further, the processor may be configured to compute a plurality of function parameters indicative of variation of saturation across the plurality of frames for the identified ROI. Furthermore, the processor may be configured to modify the plurality of function parameters across the plurality of frames for the identified ROI, based on a speed of the vehicle. Thereafter, the processor may be configured to enhance a saturation value in a new frame received subsequent to the plurality of frames of the captured video, based on the modified plurality of function parameters across the plurality of frames to obtain enhanced video. Subsequently, the processor may be configured to enhance the saturation value further by dynamically tuning and updating the plurality of function parameters. Finally, the processor may be configured to navigate the vehicle based on the enhanced video.

Furthermore, the present disclosure includes a non-transitory computer readable medium including instructions stored thereon that when processed by at least one processor cause a device to perform operations for generating enhanced video by removing fog for vehicle navigation. Further, the processor causes the device to perform operation of identifying a Region of Interest (ROI) in a plurality of frames extracted from a captured video associated with a vehicle. Furthermore, the processor causes the device to perform operation of computing a plurality of function parameters indicative of variation of saturation across the plurality of frames for the identified ROI. Thereafter, the processor causes the device to perform operation of modifying the plurality of function parameters across the plurality of frames for the identified ROI, based on a speed of the vehicle. Subsequently, the processor causes the device to perform operation of enhancing a saturation value in a new frame received subsequent to the plurality of frames of the captured video, based on the modified plurality of function parameters across the plurality of frames to obtain an enhanced video, wherein the enhanced saturation value is further dynamically tuned by updating the plurality of function parameters. Finally, the processor causes the device to perform operation of navigating the vehicle based on the enhanced video.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 8 shows a general-purpose computer system to generate enhanced video by removing fog, in accordance with embodiments of the present disclosure It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

The present disclosure describes a system and method for removing the fog (106) or haze from a captured video during navigation of a vehicle (104). Further, the fog (106) or haze removal may be performed to achieve enhanced visibility and to alert a driver or a driver assistance system of the vehicle (104) about possible obstructions during the vehicle (104) navigation in the presence of fog (106) or haze. The present disclosure considers a speed of the vehicle (104) along with the image processing techniques to identify variation of saturation degradation due to haze or fog (106) across multiple frames of the captured video. The fog (106) or haze removal based on the plurality of function parameters may be dynamically calculated in near real-time based on the measured speed of the vehicle (104) and dynamically varying fog (106) or haze conditions. Later, the plurality of function parameters may be used to produce enhanced video. Further, the present disclosure discloses a vision assisted system where the enhanced view may be generated over a screen for better driving experience.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
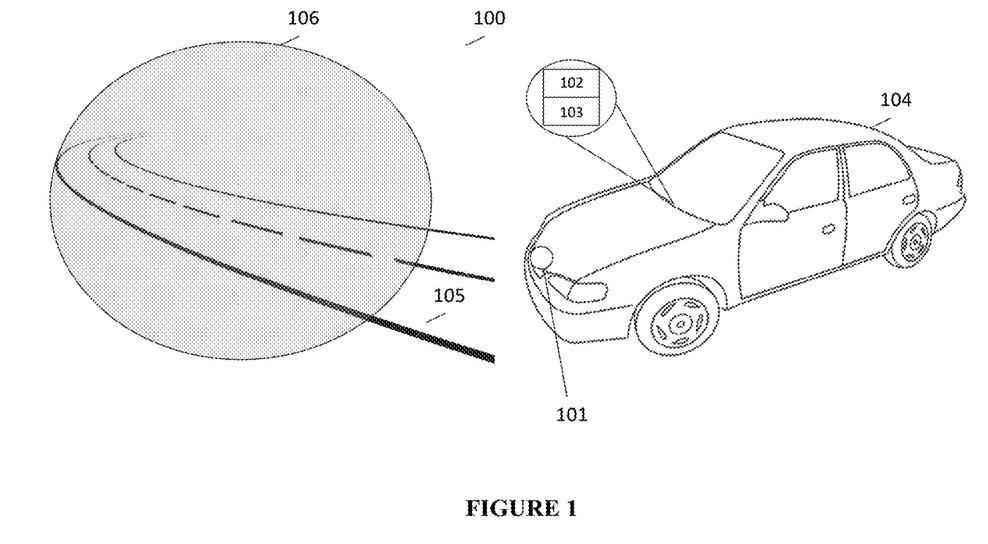
FIG. 1 shows an exemplary environment for navigating a vehicle using a generated enhanced video by removing fog, in accordance with some embodiments of the present disclosure.

FIG. 1 shows an exemplary environment for navigating a vehicle (104) using a generated enhanced video by removing fog (106) in accordance with some embodiments of the present disclosure.

In an embodiment, a vehicle (104) navigating on the road (105) filled with fog (106) may comprise a camera (101) associated with the vehicle (104) so that it may record the video of the navigation path ahead in front of the vehicle (104) as seen by the driver. The video captured by the camera (101) may be sent to an image enhancement unit (102) for producing an enhanced video by removing the fog (106) in the captured video in near real time. The fog (106) in the captured video may be removed by varying the saturation level of the pixels to produce the enhanced video. The enhanced video produced by the image enhancing unit (102) may be sent to a display unit (103) fitted inside the vehicle (104) for assisting or improving the visibility of the navigation path ahead for the driver. Further, the driver may manually vary the saturation levels of the video displaying in the display unit (103) to enhance the visibility.

In an embodiment, the vehicle (104) may be a manned vehicle (104) driven by a driver or an autonomous vehicle (104) driven by a driver assistance system.

In an embodiment the camera (101) associated with the vehicle (104) may be a color camera or an Infrared camera.

In an embodiment the camera (101) may be fitted on the vehicle (104) suitably to capture the video of the navigation path ahead.

In an embodiment the saturation level of the enhanced video further may be dynamically varied based on the Signal to Noise Ratio (SNR) at predefined distances in the enhanced video to improve the visibility of the navigation path ahead.

In an embodiment the image enhancing unit (102) may be present in a variety of miniature computing systems, such a smartphone, a dedicated handheld device, a tablet, vehicle (104) infotainment system, a server and the like.

In an embodiment the camera (101) and the image enhancing unit (102) may be connected through a wired or a wireless medium.

In an embodiment the image enhancing unit (102) and the display unit (103) may be connected through a wired or a wireless medium.

Figure 2:
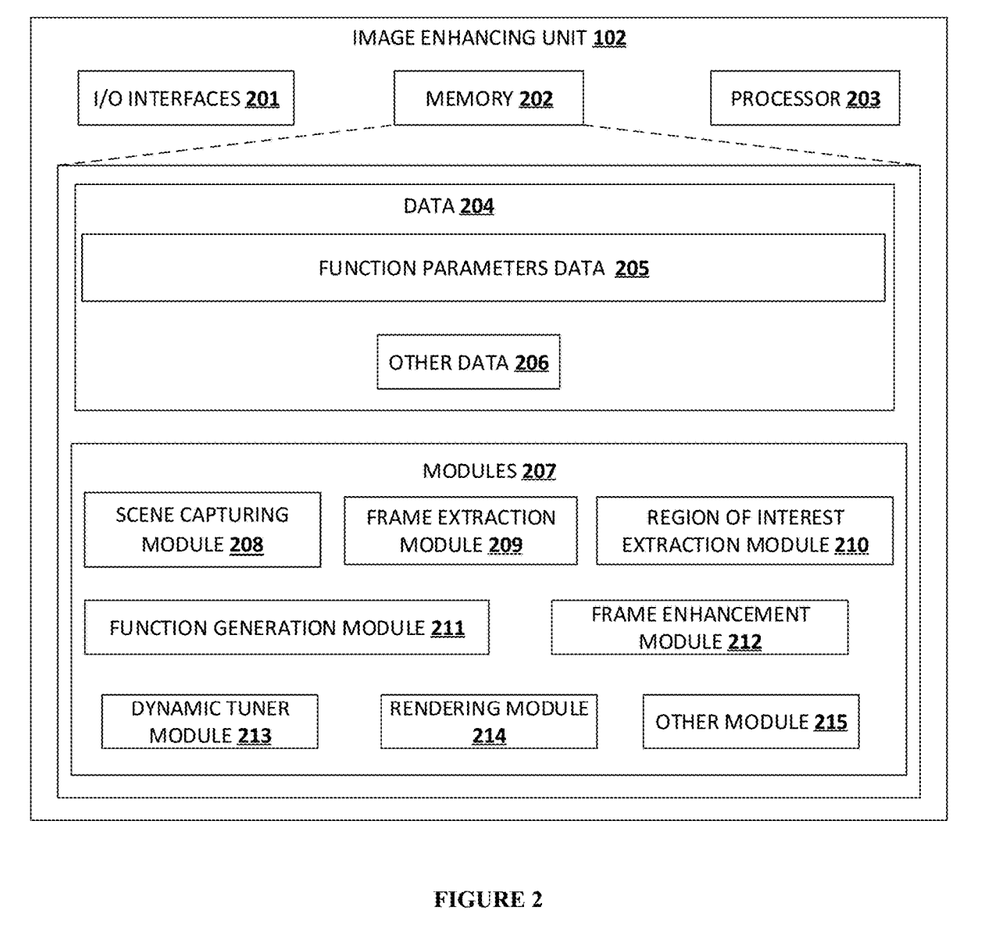
FIG. 2 shows a detailed block diagram of image enhancing unit used to generate the enhanced video, in accordance with some embodiments of the present disclosure.

FIG. 2 shows a detailed block diagram of image enhancing unit (102) used to generate the enhanced video in accordance with some embodiments of the present disclosure.

The image enhancing unit (102) may include Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The image enhancing unit (102) further includes an Input/Output (I/O) interface (201). The I/O interface (201) may be coupled with the processor (203) through which an input signal or/and an output signal may be communicated. In one embodiment, the image enhancing unit (102) may receive a captured video for fog (106) removal through the I/O interface (201).

In some implementations, the image enhancing unit (102) may include data (204) and modules (207). As an example, the data (204) and modules (207) may be stored in the memory (202) configured in the image enhancing unit (102) as shown in the FIG. 2. In one embodiment, the data (204) may include, for example, function parameters data (205) and other data (206). In the illustrated FIG. 2, modules (207) are described herein in detail.

In some embodiments, data (204) may be stored in the memory (202) in form of various data structures. Additionally, the data (204) may be organized using data models, such as relational or hierarchical data models. The other data (206) may store data, including temporary data and temporary files, generated by the modules (207) for performing the various functions of the image enhancing unit (102).

In some embodiments, the data (204) stored in the memory (202) may be processed by the modules (207) of the image enhancing unit (102). The modules (207) may be stored within the memory (202). In an example, the modules (207) communicatively coupled to the processor (203) configured in the content management server 104, may also be present outside the memory (202) as shown in FIG. 2 and implemented as hardware. As used herein, the term modules (207) may refer to an application specific integrated circuit (ASIC), a FPGA (Field Programmable Gate Array), an electronic circuit, a processor (203) (shared, dedicated, or group) and memory (202) that execute one or more software or firmware programs, a combinational logic circuit, and/or other suitable components that provide the described functionality. In some other embodiments, the modules (207) may be implemented using at least one of ASICs or FPGAs.

In an embodiment, the function parameters data (alternatively referred as plurality of function parameters) (205) may include one or more constants denoted as b0, b1, b2 and the like. The plurality of function parameters (205) are indicative of variation of saturation. The function parameters data (205) may be obtained using a curve fitting or regression-based techniques on saturation values across plurality of frames in a captured video.

In one implementation, the modules (207) may include, for example, a scene capturing module (208), a frame extraction module (209), and a region of interest extraction module (210), a function generation module (211), and a frame enhancement module (212), a dynamic tuner module (213), a rendering module (214) and other module (215). It may be appreciated that such aforementioned modules may be represented as a single module or a combination of different modules.

In an embodiment, the scene capturing module (208) may be used to record a video of the navigation path ahead using the camera (101) associated with the vehicle (104). Further, the scene capturing module (208) may send the recorded video or captured video to the frame extraction module (209) to extract plurality frames of the recorded video. The scene capturing module (208) may buffer the video until the subsequent module requests the video for further processing.

In an embodiment, the frame extraction module (209) may be responsible for extracting plurality of frames from the captured video. This may be done to process the plurality of frames independently. The extraction of the plurality of frames depends on the type of camera used for recording or capturing the navigation path ahead. For a real-time system, the frame may be extracted from a Hardware Abstraction Layer (HAL). The extracted frames of the captured video may be divided into groups for further processing. Herein, the groups may be denoted as plurality of frames or window of frames in the present disclosure.

In an embodiment, the Region of Interest (ROI) extraction module (210) may use the plurality of frames extracted by the frame extraction module (209) to identify the ROI related to context of navigating the vehicle. The ROI may be generated based on one or more objects present in the frame. A frame may be first subjected to region extraction by generating boundaries of one or more objects present in the frame. The boundaries may be generated with active contours for example a snake model, a gradient vector flow snake model, a balloon model and a geometric model. Further, multiple seed pixels may be selected in a frame and pixels within the generated boundaries having same energy as compared with seed pixels may be filled or merged to extract the one or more objects in the frame. The extracted one or more objects may be identified by associating a name of known objects from a vocabulary for example as vehicle, signboard, boulder, road (105), curve, sky and the like. The identification may be done using a trained image classifier. The identified objects denote the Region of Interest in a frame.

In an embodiment, the identified ROI may include at least one of a road (105) region, a plurality of road signs, one or more traffic signals, a natural object, or one or more other vehicles.

In an embodiment, the function generation module (211) may be responsible for computing a plurality of function parameters (205) indicative of saturation across the plurality of frames for the identified ROI. Further, the function generation module (211) may modify the plurality of function parameters (205) across the plurality of frames for the identified ROI based on the speed of the vehicle (104). The plurality of function parameters (205) may be used to enhance the saturation level of the pixels in the frame for improving the visibility by removing fog (106) in the frame. The plurality of function parameters (205) may be computed by determining a mean saturation for a plurality of dominated hue components in the determined ROI across the plurality of frames. Further, a function may be fitted for the determined mean saturation across the plurality of frames. The plurality of function parameters (205) may be modified by determining speed variation of the vehicle (104) and calculating number of frames captured based on the determined speed variation of the vehicle (104).

In an embodiment, the frame enhancement module (212) may be responsible for correcting or updating the initial saturation values of the pixels for a new frame recorded or captured by the scene capturing module (208) received subsequent to the plurality of frames of the captured video to generate an enhanced frame. The initial saturation values of the pixels may be updated based on the modified plurality of function parameters and a calculated number of frames in a window. Further, the saturation values of the pixels may be computed for the new frame at the all identified ROI for a significant hue component. The computed saturation values of the pixels may be processed in Hue Saturation and Value (HSV) color space. For a chosen pixel the Hue and Value components remain same and only the saturation (S) component may be updated with the computed value. The enhanced frame may be sent to the rendering module (214) for displaying on the display unit (103).

In an embodiment, the frame enhancement module (212) may update the entire frame or only the pixels of the identified ROI.

In an embodiment, the dynamic tuner module (213) may be used to dynamically fine-tune the plurality of function parameters (205) and vary the saturation values of the pixels in the frame to accommodate the varying density of the fog.

In an embodiment, the plurality of function parameters (205) may be varied based on the driver or user inputs. For example, a knob may be provided to vary the plurality of function parameters (205) $b_1$, $b_2$ and the like until a clear picture may be seen over the display unit (103).

In an embodiment, for the autonomous vehicles a Signal to Noise Ratio (SNR) may be computed at two or more different points at two or more predefined distances in the frame. The computed SNR as a function of distance may be computed and compared with a standard SNR curve. Further, the plurality of function parameters (205) may be dynamically fine-tuned until the computed SNR as a function of distance matches the standard curve.

In an embodiment, the rendering module (214) may be connected to the display unit (103) of the vehicle. It may collect the enhanced video from the dynamic tuner module (213) and display the enhanced video on the display unit (103) to improve the visibility of the driver. Further, the rendering module (214) may store and sequence the frames of the enhanced video and maintains a constant frame rate of rendering irrespective of the processing time. Furthermore, the dynamic tuner module (213) may buffer the frames to achieve the constant frame rate. For example, a frame rate of 24 may be required having a processing delay of less than 1 second.

In an embodiment, the rendering module (214) may provide the enhanced video to the driver assistant system of an autonomous vehicle. Further, the driver assistant system may interpret for example a signboard, an obstacle and the like to decide on the navigation path of the vehicle (104) by changing at least one of a lane, speed or direction of the vehicle.

Figure 3:
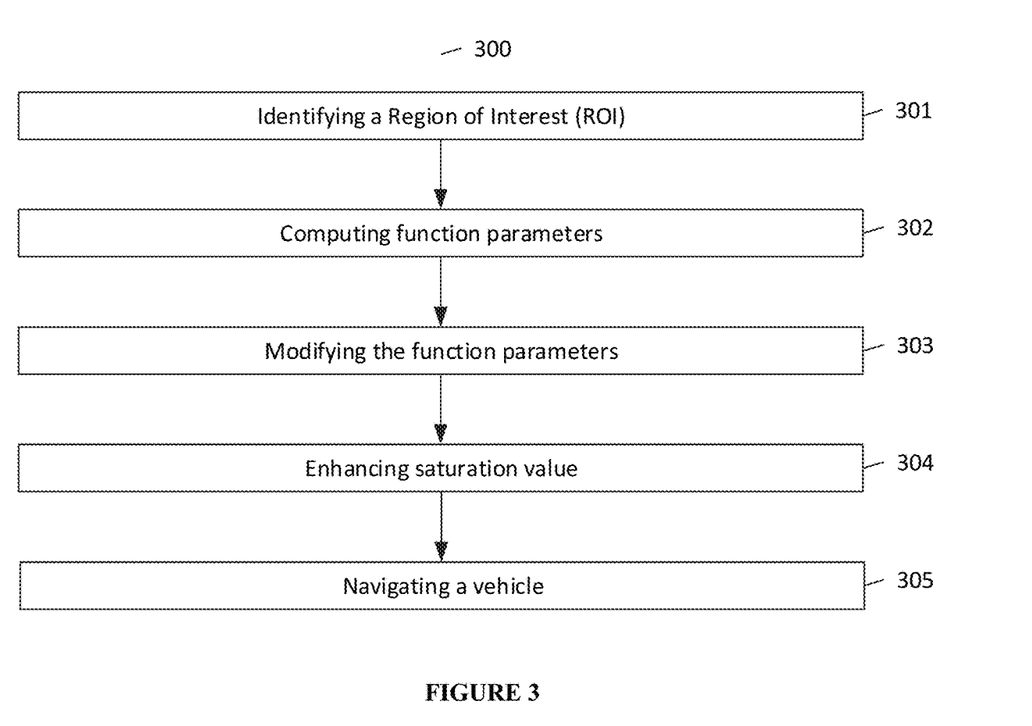
FIG. 3 shows a flowchart illustrating method for generating enhanced video by removing fog for vehicle navigation, in accordance with some embodiment of the present disclosure.

FIG. 3 shows a flowchart illustrating method for generating enhanced video by removing fog (106) for vehicle (104) navigation, in accordance with some embodiment of the present disclosure.

The order in which the method 300 may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At the step 301, the method may include identifying, by the image enhancing unit (102), a Region of Interest (ROI) in the plurality of frames in the video captured by the scene capturing module (208) and the plurality of frames extracted by the frame extraction module (209). The ROI may be generated based on one or more objects present in the frame. The plurality of frames may be first subjected to region extraction by generating boundaries of one or more objects present in the frame. The boundaries may be generated with active contours for example the snake model, the gradient vector flow snake model, the balloon model and the geometric model. Further, multiple seed pixels may be selected in the plurality of frames and pixels within the generated boundaries having same energy as compared with seed pixels may be filled or merged to extract the one or more objects in the plurality of frames. The extracted one or more objects may be identified by associating a name of known objects from a vocabulary for example as vehicle, signboard, boulder, road (105), curve, sky and the like. The identification may be done using a trained image classifier. The identified objects denote the Region of Interest in the plurality of frames.

Figure 4:
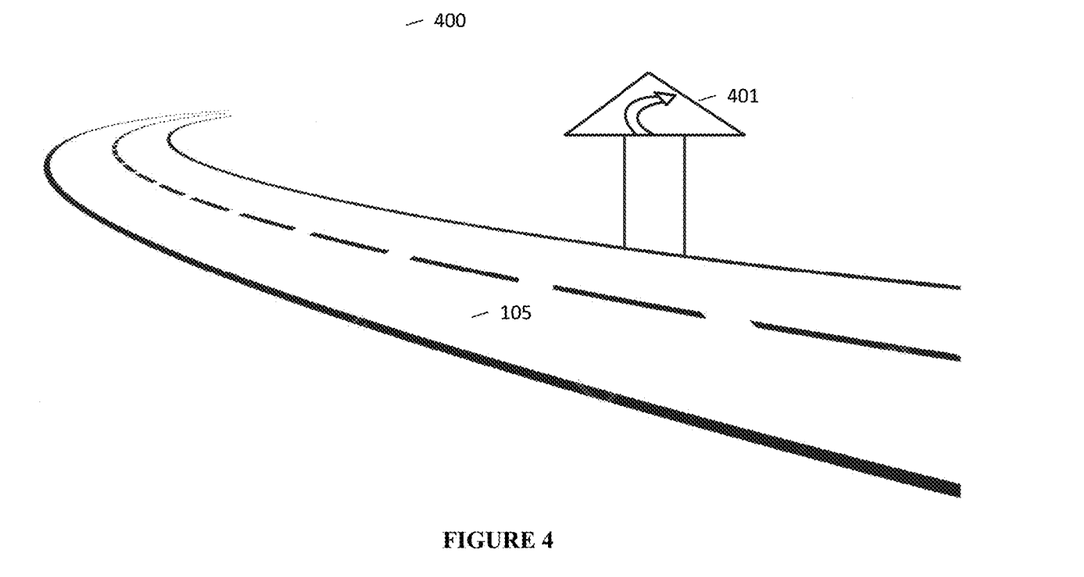
FIG. 4 shows an exemplary Region of Interest (ROI) identified in a frame from a captured video, in accordance with some embodiments of the present disclosure.

As shown in FIG. 4 an exemplary Region of Interest (ROI) may be identified in a frame from a captured video. The boundaries for a road (105) including the road (105) edges, road (105) markers and a road sign (401) may be generated in the frame. The seed pixels may be selected from at least one of a centre of a road (105), from a road (105) marker, or from a road (105) sign (401) and the one or more objects may be extracted in the frame by merging the pixels having same energy as compared with selected seed pixels. Further, the extracted one or more objects may be identified as the road (105) and the road sign (401) using the trained image classifier.

At the step 302, the method may include computing, by the image enhancing unit (102), a plurality of function parameters. For the identified ROI as detailed in the step 301, a plurality of dominated hue components may be determined. A plot of the dominated hue component versus a pixel count may be plotted. Further, a median for the band hue of dominated hue component may be determined. For each of the dominated hue components in a ROI a mean saturation may be computed, and a plot of hue versus mean saturation may be plotted. The mean saturation provides information on the average saturation value for a particular band of hue. The mean saturation may be computed by considering the band of hue across the median of the dominated hue component. The mean saturation of the dominated hue component for the corresponding ROI may be computed across a plurality of frames or a window of frames. A function $f(n)=b_0+b_1*n+b_2*n^2$, may be fitted to each of the computed mean saturation across the plurality of frames corresponding to the ROI. Where $b_0$ indicates the saturation of the initial frame latest in time among the plurality of frames, $b_1$ and $b_2$ indicates the plurality of function parameters, n indicates the position of the current frame with respect to the initial frame and f(n) indicates the mean saturation value of the current frame n. A plurality of function parameters $b_1$ and $b_2$ may be computed using the fitted function f(n). Further, the function f(n) depicts the variation of mean saturation of a ROI across the plurality of frames till the current frame. Further, the plurality of function parameters, $b_1$ and $b_2$ may be computed for each of the dominated hue components corresponding to the ROI. Furthermore, the plurality of function parameters, $b_1$ and $b_2$ may be computed to each of the identified ROI across the plurality of frames.

Figure 5:
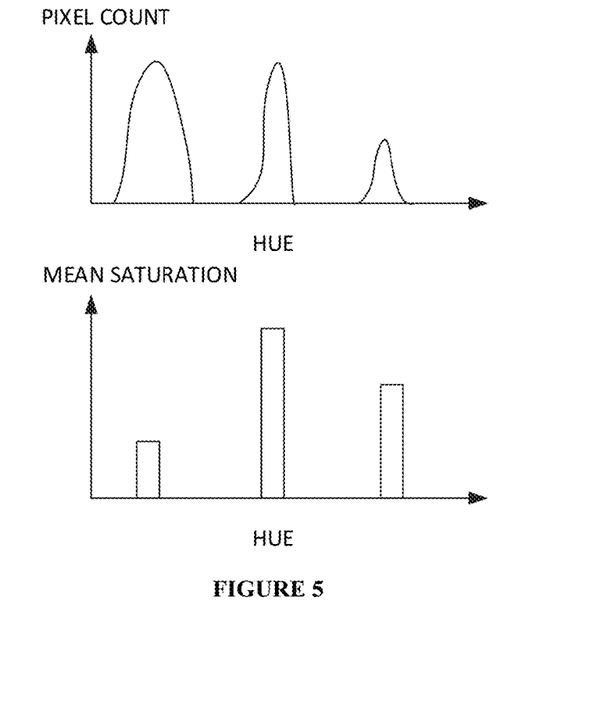
FIG. 5 shows an exemplary hue saturation plot of an identified Region of Interest (ROI), in accordance with some embodiments of the present disclosure.

As shown in FIG. 5 an exemplary hue saturation plot may be plotted corresponding to an identified Region of Interest (ROI). Initially all the dominated hue components in a ROI may be identified and hue component versus a pixel count may be plotted. As shown in FIG. 5 three dominated hue components may be identified and the number of pixels having a particular hue value in the ROI may be counted and a plot of hue versus pixel count may be plotted as shown in FIG. 5. Further, a mean saturation may be computed by considering the band of hue across the median of the dominated hue component for all the three identified dominated hue components. A plot of hue versus mean saturation may be plotted for the three identified dominated hue components corresponding to the identified ROI.

Figure 6:
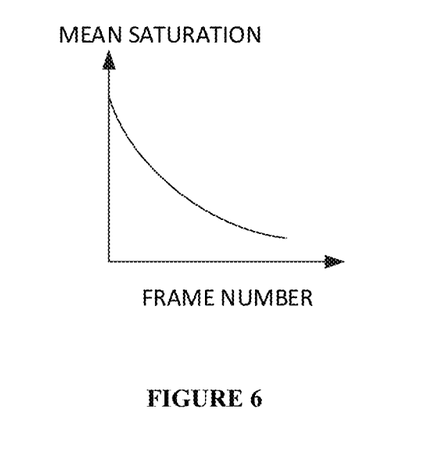
FIG. 6 shows an exemplary variation of mean saturation of a dominated hue component in an identified Region of Interest (ROI) across a plurality of frames, in accordance with some embodiments of the present disclosure.

As shown in FIG. 6 an exemplary variation of mean saturation of a dominated hue component in an identified Region of Interest (ROI) across a plurality of frames. The mean saturation may be computed for an identified dominated hue component in a ROI across a plurality of frames or a window of frames. Further, a function f(n) as may be fitted to the computed mean saturation of the dominated hue component across the plurality of frames. An exemplary fitted function may be as shown in FIG. 6, indicating the variation of mean saturation of the dominated hue component across the plurality of frames. From the fitted function shown in FIG. 6, a plurality of function parameters $b_1$ and $b_2$ may be computed for the dominated hue component in a ROI.

At the step 303, the method may include modifying, by the image enhancing unit (102), the plurality of function parameters. The speed variation of the vehicle (104) may be determined, and the number of frames captured may be calculated based on the speed variation of the vehicle. Further, the plurality of function parameters may be modified based on the calculated number of frames. The modification to the plurality of function parameters may be performed by fitting a function $g(n)=b_0+b_1*n'+b_2*(n')^2$. Where $b_0$ indicates the saturation of the initial frame latest in time among the plurality of frames, $b_1$ and $b_2$ indicates the plurality of function parameters, n' indicates the number of frames captured based on the speed variation of the vehicle (104) and g(n) indicates the mean saturation value of the current frame n'. The plurality of function parameters $b_1$ and $b_2$ may be modified using the function g(n).

In an embodiment let $N_1$ meters/second denote the current speed of the vehicle, d meters denote the distance covered by the vehicle (104) and f denote the frame rate per second. Therefore, the time taken by the vehicle (104) to cover a distance of d meters may be computed as $t_1=d/N_1$ seconds. The number of frames captured may be determined as $f*t_1$ or $f*(d/N_1)$ and denoted by $n_1$. Further, let the speed of the vehicle (104) change from N meters/second to $N_2$. Therefore, the time taken to cover the same distance d meters may be computed as $t_z=d/N_2$ and the number of frames captured may be determined as $f*t_z$ or $f*(d/N_2)$ and denoted by $n_2$. Subsequently, the relation between $n_1$ and $n_2$ can be expressed as $n_2=(N_1/N_2)*n_1$. The $n_2$ may be further used to fit the function g(n) as $g(n)=b_0+b_1*n_2 b_2*(n_2)^2$, as detailed in the step 303. Using the function g(n) the plurality of function parameters $b_1$ and $b_2$ may be modified to compensate for the change in the speed of the vehicle.

At the step 304, method may include enhancing, by the image enhancing unit (102) the saturation value of the pixels in a new frame. The saturation value of the pixels in a new frame may be enhanced by computing initial saturation value of the pixels of the corresponding ROI and updating the initial saturation value based on the plurality of function parameters modified at the step 303 and the calculated number of frames at the step 303. Let $S_0$ denote the initial saturation value of the pixels of the ROI. $S_0$ may be computed by measuring the pixel value in the frame. Further, a new saturation value for enhancing the pixel of the ROI may be computed using the equation $S=S_0+b_1*n'+b_2*(n')^2$. Where S denotes the new saturation value for the pixel of the ROI. $b_1$ and $b_2$ denotes the plurality of function parameters modified at the step 303 and n denotes the number of frames captured corresponding to the speed variation of the vehicle (104) computed at the step 303. The new saturation value may be computed for all the pixels corresponding to an identified ROI at the step 301. The processing of a new frame may be performed in Hue, Saturation and Value (HSV) color space where H and V components remain same and only the S component may be updated with the new saturation value. The enhanced plurality of frames forming an enhanced video may be sent to the display unit (103) for improving the visibility of the driver.

In an embodiment a new saturation value may be computed for all the pixels in a frame.

At the step 305, the method may include navigating the vehicle (104) based on the enhanced video. The enhanced video obtained at the step 304 may be displayed on the display unit (103) present in the vehicle (104) using the rendering module (214).

Figure 7A:
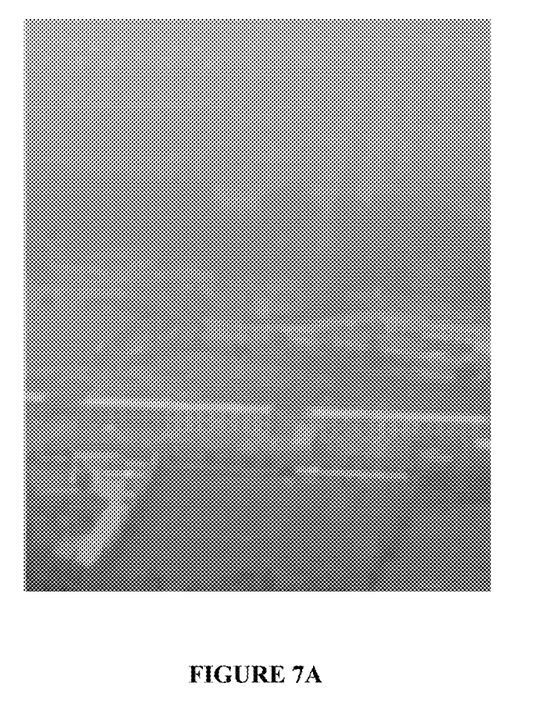
FIG. 7A shows an exemplary frame extracted from a captured video in the presence of fog, in accordance with some embodiments of the present disclosure.

As an example, FIG. 7A shows an exemplary frame captured by the camera (101) associated with the vehicle (104) in the presence of fog.

Figure 7B:
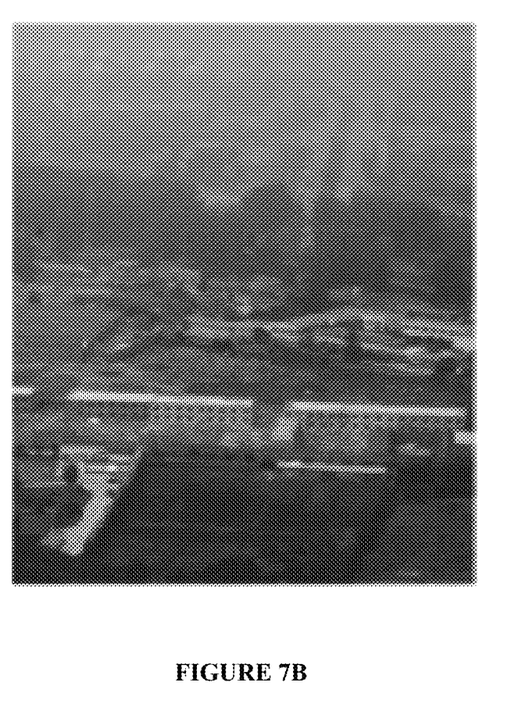
FIG. 7B shows an exemplary enhanced frame produced by removing fog of a captured video in the presence of fog, in accordance with some embodiments of the present disclosure.

As an example, FIG. 7B shows an exemplary enhanced frame produced by employing the method steps 301 to 304 for removing the fog (106) present in the exemplary frame shown in FIG. 7A. Further, the enhanced frame may be displayed to the driver for improving visibility during vehicle (104) navigation.

In an embodiment the enhanced video may be dynamically tuned to improve the visibility by modifying the plurality of function parameters and vary the saturation values of the pixels in the frame to accommodate the varying density of the fog.

In an embodiment, the plurality of function parameters may be varied based on the driver or user inputs. For example, a knob may be provided to vary the plurality of function parameters $b_1$, $b_2$ and the like until a clear picture may be seen over the display unit (103).

In an embodiment, for the autonomous vehicles a Signal to Noise Ratio (SNR) may be computed at two or more different points at two or more predefined distances in the frame. The computed SNR as a function of distance may be computed and compared with a standard SNR curve. Further, the plurality of function parameters may be dynamically fine-tuned until the computed SNR as a function of distance matches the standard curve.

Computer System

Figure 8:
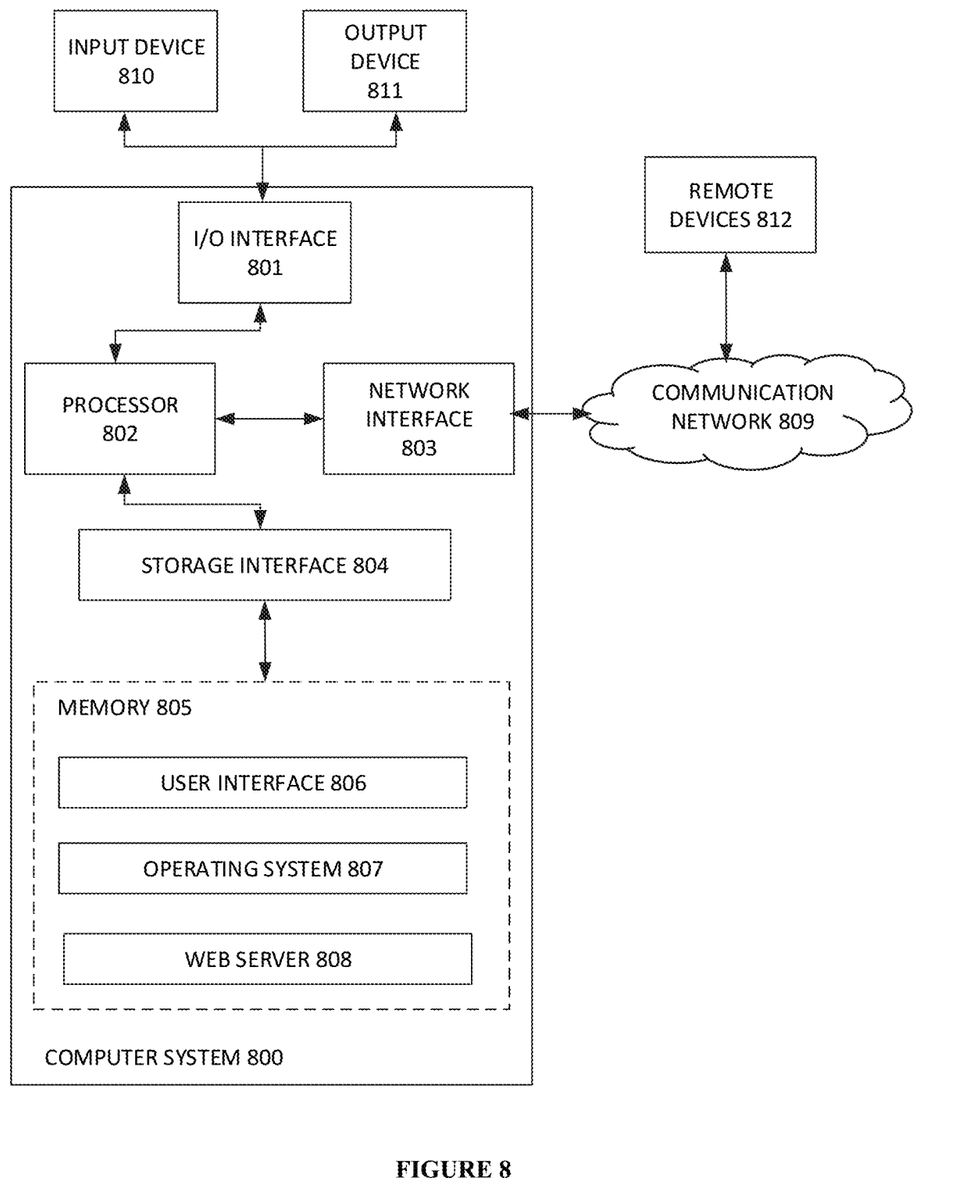

FIG. 8 illustrates a block diagram of an exemplary computer system (800) for implementing embodiments consistent with the present disclosure. In an embodiment, the computer system (800) may be used to implement the method for generating enhanced video by removing fog (106) for vehicle (104) navigation. The computer system (800) may comprise a central processing unit ("CPU" or "processor") (802). The processor (802) may comprise at least one data processor for executing program components for dynamic resource allocation at run time. The processor (802) may include specialized processing units such as integrated system (bus) controllers, memory management control units, floating point units, graphics processing units, digital signal processing units, etc.

The processor (802) may be disposed in communication with one or more input/output (I/O) devices (not shown) via I/O interface (801). The I/O interface (801) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (801), the computer system (800) may communicate with one or more I/O devices. For example, the input device (810) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (811) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (800) is connected to the service operator through a communication network (809). The processor (802) may be disposed in communication with the communication network (809) via a network interface (803). The network interface (803) may communicate with the communication network (809). The network interface (803) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (809) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (803) and the communication network (809), the computer system (800) may communicate with the one or more service operators.

In some embodiments, the processor (802) may be disposed in communication with a memory (805) (e.g., RAM, ROM, etc. not shown in FIG. 8 via a storage interface (804). The storage interface (804) may connect to memory (805) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (805) may store a collection of program or database components, including, without limitation, user interface (806), an operating system (807), web server (808) etc. In some embodiments, computer system (800) may store user/application data (806), such as the data, variables, records, etc. as described in this disclosure. Such databases may be implemented as fault-tolerant, relational, scalable, secure databases such as Oracle or Sybase.

The operating system (807) may facilitate resource management and operation of the computer system (800). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (800) may implement a web browser (808) stored program component. The web browser (808) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (808) may utilize facilities such as AJAX, DHTML, ADOBE® FLASH®, JAVASCRIPT®, JAVA®, Application Programming Interfaces (APIs), etc. In some embodiments, the computer system (800) may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (800) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor (802) may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Thus, the generation of enhanced video by removing fog (106) for vehicle (104) navigation ensures displaying the enhanced video for vehicle (104) navigation and improve the vehicle (104) navigation experience. The generated enhanced video utilizes the speed of the vehicle (104) for fog (106) removal. Further, the saturation may be enhanced in the new frame by considering a variation of saturation in the plurality of previous frames. The enhanced video may be generated based on the identified region of interest for example a traffic sign. The enhanced video generated by fog (106) removal may be robust and supports multiple foggy conditions.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A method of generating enhanced video by removing fog for vehicle navigation, wherein the method comprises:
   identifying, by an image enhancing unit, a Region of Interest (ROI) in a plurality of frames extracted from a captured video associated with a vehicle;
   computing, by the image enhancing unit, a plurality of function parameters indicative of variation of saturation across the plurality of frames for the identified ROI;
   modifying, by the image enhancing unit, the plurality of function parameters across the plurality of frames for the identified ROI, based on a speed of the vehicle;
   enhancing, by the image enhancing unit, a saturation value in a new frame received subsequent to the plurality of frames of the captured video, based on the modified plurality of function parameters across the plurality of frames to obtain an enhanced video, wherein the enhanced saturation value is further dynamically tuned by updating the plurality of function parameters; and
   navigating, by the image enhancing unit, the vehicle based on the enhanced video.

2. The method of claim 1, wherein the identifying the ROI comprises:
   generating boundaries of one or more objects in each frame of the plurality of frames;
   extracting the one or more objects by filling pixels within the generated boundaries having same energy as compared with seed pixels; and
   identifying the extracted one or more objects based on a trained image classifier.

3. The method of claim 1, wherein the identified ROI comprises at least one of a road region, a plurality of road signs, one or more traffic signals, a natural object, or one or more other vehicles.

4. The method of claim 1, wherein the computing the plurality of function parameters comprises;
   determining a mean saturation for a plurality of dominated hue components in the determined ROI across the plurality of frames; and
   fitting a function for the determined mean saturation across the plurality of frames for computing the plurality of function parameters.

5. The method of claim 1, wherein the modifying the plurality of function parameters comprises:
   determining speed variation of the vehicle;
   calculating number of frames captured based on the determined speed variation of the vehicle; and
   modifying the plurality of function parameters based on the calculated number of frames.

6. The method of claim 1, wherein the enhancing the saturation value in the new frame comprises:
   computing initial saturation of the corresponding ROI; and
   updating the initial saturation based on the plurality of function parameters and the calculated number of frames.

7. An image enhancing unit, for generating enhanced video by removing fog for vehicle navigation comprising:
   a processor; and
   a memory communicatively coupled to the processor, wherein the memory stores the processor instructions, which, on execution, causes the processor to:
      identify a Region of Interest (ROI) in a plurality of frames extracted from a captured video associated with a vehicle;
      compute a plurality of function parameters indicative of variation of saturation across the plurality of frames for the identified ROI;
      modify the plurality of function parameters across the plurality of frames for the identified ROI, based on a speed of the vehicle;
      enhance a saturation value in a new frame received subsequent to the plurality of frames of the captured video, based on the modified plurality of function parameters across the plurality of frames to obtain an enhanced video, wherein the enhanced saturation value is further dynamically tuned by updating the plurality of function parameters; and
      navigate the vehicle based on the enhanced video.

8. The image enhancing unit of claim 7, wherein the processor is configured to identify the ROI comprises:
   generating boundaries of one or more objects in each frame of the plurality of frames;
   extracting the one or more objects by filling pixels within the generated boundaries having same energy as compared with seed pixels; and
   identifying the extracted one or more objects based on a trained image classifier.

9. The image enhancing unit of claim 7, wherein the identifying ROI includes at least one of a road region, a plurality of road signs, one or more traffic signals, a natural object, or one or more other vehicles.

10. The image enhancing unit of claim 7, wherein the processor is configured to compute the plurality of function parameters comprises:
   determining a mean saturation for a plurality of dominated hue components in the determined ROI across the plurality of frames; and
   fitting a function for the determined mean saturation across the plurality of frames for computing the plurality of function parameters.

11. The image enhancing unit of claim 7, wherein the processor is configured to modify the plurality of function parameters comprises:
   determining speed variation of the vehicle;
   calculating number of frames captured based on the determined speed variation of the vehicle; and
   modifying the plurality of function parameters based on the calculated number of frames.

12. The image enhancing unit of claim 7, wherein the processor is configured to enhance a saturation value in new frame comprises:
   computing initial saturation of the corresponding ROI; and
   updating the initial saturation based on the plurality of function parameters and the calculated number of frames.

13. A non-transitory computer readable medium including instructions stored thereon for generating enhanced video by removing fog for vehicle navigation that when processed by at least one processor cause a device to perform operations comprising:
   identifying a Region of Interest (ROI) in a plurality of frames extracted from a captured video associated with a vehicle;
   computing a plurality of function parameters indicative of variation of saturation across the plurality of frames for the identified ROI;
   modifying the plurality of function parameters across the plurality of frames for the identified ROI, based on a speed of the vehicle;
   enhancing a saturation value in a new frame received subsequent to the plurality of frames of the captured video, based on the modified plurality of function parameters across the plurality of frames to obtain an enhanced video, wherein the enhanced saturation value is further dynamically tuned by updating the plurality of function parameters; and
   navigating the vehicle based on the enhanced video.

\* \* \* \* \*